United States Patent
Shah et al.

(10) Patent No.: US 9,037,821 B1
(45) Date of Patent: May 19, 2015

(54) SYSTEMS AND METHODS FOR REPLICATING SNAPSHOTS ACROSS BACKUP DOMAINS

(75) Inventors: Jeenal Shah, Eden Prairie, MN (US); Guido Westenberg, Columbia Heights, MN (US); Claudia Rudolph, Medina, MN (US); Thomas Tyler, St. Louis Park, MN (US); Abrar Hussain, Blaine, MN (US)

(73) Assignee: Symantec Corporation, Mountain View, CA (US)

( * ) Notice: Subject to any disclaimer, the term of this patent is extended or adjusted under 35 U.S.C. 154(b) by 339 days.

(21) Appl. No.: 13/544,933

(22) Filed: Jul. 9, 2012

(51) Int. Cl.
| | |
|---|---|
| *G06F 13/00* | (2006.01) |
| *G06F 3/06* | (2006.01) |
| *G06F 11/14* | (2006.01) |
| *G06F 21/79* | (2013.01) |
| *G06F 12/06* | (2006.01) |

(52) U.S. Cl.
CPC .......... *G06F 3/0655* (2013.01); *G06F 11/1456* (2013.01); *G06F 21/79* (2013.01); *G06F 12/0653* (2013.01)

(58) Field of Classification Search
CPC .. G06F 11/1456; G06F 21/79; G06F 12/0653
USPC .......................................... 707/610; 711/162
See application file for complete search history.

(56) References Cited

U.S. PATENT DOCUMENTS

| | | | | |
|---|---|---|---|---|
| 8,078,816 B1* | 12/2011 | Thoppai et al. | ............... | 711/162 |
| 8,108,634 B1* | 1/2012 | Natanzon et al. | ............. | 711/162 |
| 8,352,785 B1* | 1/2013 | Nicklin et al. | .................. | 714/15 |
| 2003/0182330 A1* | 9/2003 | Manley et al. | ................ | 707/205 |
| 2006/0047713 A1* | 3/2006 | Gornshtein et al. | .......... | 707/202 |
| 2007/0008890 A1* | 1/2007 | Tseitlin et al. | ................ | 370/238 |
| 2010/0169592 A1* | 7/2010 | Atluri et al. | ................... | 711/162 |
| 2010/0211543 A1* | 8/2010 | Knight et al. | ................. | 707/617 |
| 2013/0212222 A1* | 8/2013 | Outlaw | ........................ | 709/219 |

* cited by examiner

*Primary Examiner* — Aimee Li
*Assistant Examiner* — Trang Ta
(74) *Attorney, Agent, or Firm* — ALG Intellectual Property, LLC (57) ABSTRACT

A computer-implemented method for replicating snapshots across backup domains may include 1) identifying a replication of a snapshot from a source storage device within a source domain to a target storage device within a target domain, 2) identifying a source master system within the source domain and a target master system within the target domain, 3) identifying metadata for managing the snapshot at the source master system, and 4) transmitting the metadata from the source master system to the target master system using a master-to-master communication channel that is separate from a communication channel used for the replication. Various other methods, systems, and computer-readable media are also disclosed.

20 Claims, 6 Drawing Sheets

SYSTEMS AND METHODS FOR REPLICATING SNAPSHOTS ACROSS BACKUP DOMAINS

BACKGROUND

Many organizations rely upon data replication to improve the reliability, fault-tolerance, and/or accessibility of their applications and/or data. Data replication typically involves replicating data from a source site (e.g., a backup image) or device to a target site or device.

Traditional replication systems may also write metadata that describes a volume of data to be replicated to the volume of data such that the metadata may be replicated with the volume of data. Accordingly, a system at the target site of the replication may use the metadata to correctly interpret, organize, use, and/or manage the replicated volume of data. However, some organizations may wish to replicate a snapshot of a live volume of data (e.g., to a disaster recovery site). Unfortunately, a replication system may not have access to write the metadata to the live volume.

Additionally, some replication schemes may include cascading replication (e.g., a replica copy being replicated, in turn, to a third site). Organizations may, furthermore, wish to form expiration policies for a replica of a volume that depend on the state of other replicas of the volume.

Accordingly, the instant disclosure identifies and addresses a need for additional and improved systems and methods for replicating snapshots across backup domains.

SUMMARY

As will be described in greater detail below, the instant disclosure generally relates to systems and methods for replicating snapshots across backup domains by establishing master-to-master communication channels between backup domains. In one example, a computer-implemented method for replicating snapshots across backup domains may include 1) identifying a replication of a snapshot from a source storage device within a source domain to a target storage device within a target domain, 2) identifying a source master system within the source domain and a target master system within the target domain, 3) identifying metadata for managing the snapshot at the source master system, and 4) transmitting the metadata from the source master system to the target master system using a master-to-master communication channel that is separate from a communication channel used for the replication.

The metadata may include any of a variety of metadata. For example, the metadata may include 1) file-system-level metadata describing the snapshot, 2) application-level metadata describing the snapshot, and/or 3) virtualization-level metadata describing the snapshot.

In some examples, the computer-implemented method may also include establishing the master-to-master communication channel by 1) authenticating the target domain with the source master system and 2) authenticating the source domain with the target master system. In one example, transmitting the metadata may include 1) writing the metadata to a source spool directory within the source domain and 2) transmitting the metadata to a target spool directory within the target domain.

In some embodiments, the computer-implemented method may also include coordinating storage lifecycle policy information for the snapshot between the source master system and the target master system via the master-to-master communication channel. Coordinating the storage lifecycle policy information may include coordinating any of a variety of types of information. For example, coordinating the storage lifecycle policy information may include identifying, at the target master system, at least one valid storage device for storing data from the snapshot based on a rule established at the source master system. In one embodiment, coordinating the storage lifecycle policy information may include determining, at the target master system, that a mirror replica of the snapshot is eligible for expiration based on a configuration established at the source master system. In this embodiment, determining that the mirror replica of the snapshot is eligible for expiration may include 1) identifying an additional mirror replica of the mirror replica and 2) determining that the additional mirror replica is eligible for expiration based on the configuration established at the source master system.

In some examples, the computer-implemented method may also include coordinating failure-checking information for the replication of the snapshot between the source master system and the target master system via the master-to-master communication channel.

In one embodiment, a system for implementing the above-described method may include 1) a replication module programmed to identify a replication of a snapshot from a source storage device within a source domain to a target storage device within a target domain, 2) an identification module programmed to identify a source master system within the source domain and a target master system within the target domain, 3) a metadata module programmed to identify metadata for managing the snapshot at the source master system, and 4) a transmission module programmed to transmit the metadata from the source master system to the target master system using a master-to-master communication channel that is separate from a communication channel used for the replication. The system may also include at least one processor configured to execute the replication module, the identification module, the metadata module, and the transmission module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a replication of a snapshot from a source storage device within a source domain to a target storage device within a target domain, 2) identify a source master system within the source domain and a target master system within the target domain, 3) identify metadata for managing the snapshot at the source master system, and 4) transmit the metadata from the source master system to the target master system using a master-to-master communication channel that is separate from a communication channel used for the replication.

As will be explained in greater detail below, by establishing master-to-master communication channels between backup domains, the systems and methods described herein may facilitate the interpretation, organization, use, and/or management of replicas across backup domains. For example, these systems and methods may establish master-to-master communication channels between masters systems of backup domains for transmitting metadata describing replicas, information for managing replicas (e.g., expiry policy and/or expiry status information), and/or information describing the health of systems performing replications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
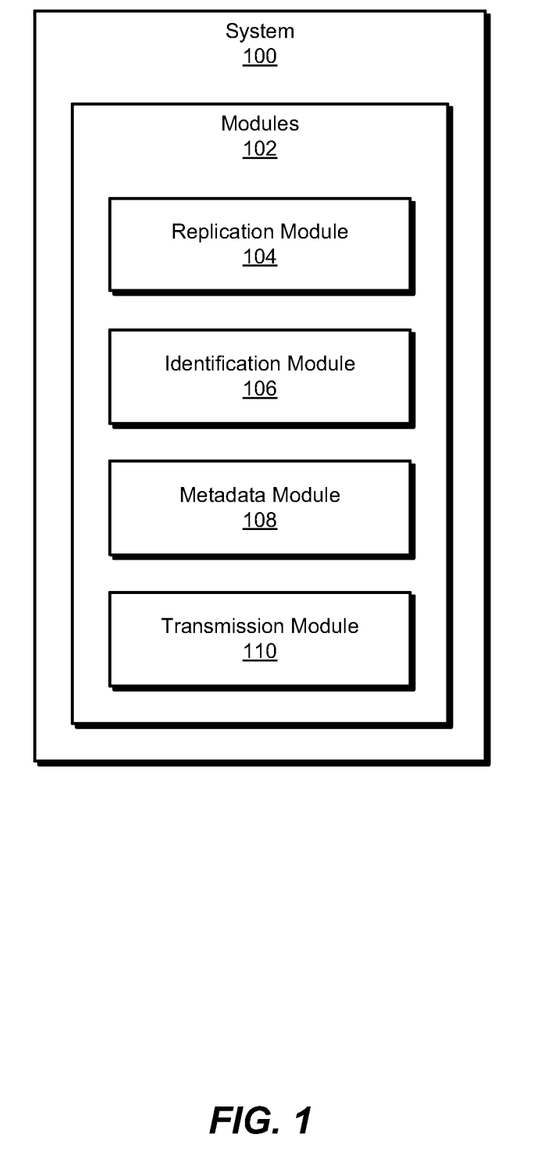
FIG. 1 is a block diagram of an exemplary system for replicating snapshots across backup domains.
Figure 2:
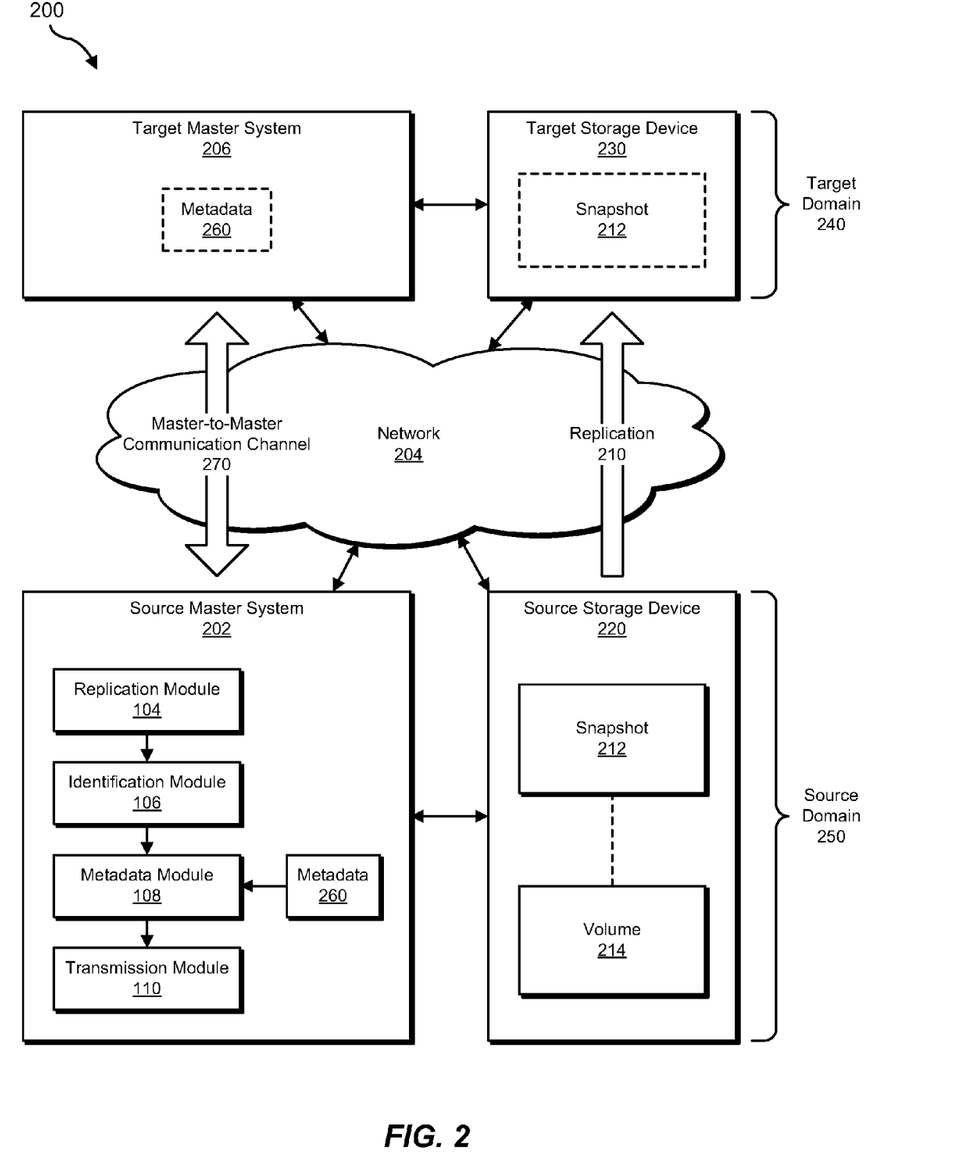
FIG. 2 is a block diagram of an exemplary system for replicating snapshots across backup domains.

The following will provide, with reference to FIGS. 1-2, detailed descriptions of exemplary systems for replicating snapshots across backup domains. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for replicating snapshots across backup domains. As illustrated in this figure, exemplary system 100 may include one or more modules 102 for performing one or more tasks. For example, and as will be explained in greater detail below, exemplary system 100 may include a replication module 104 programmed to identify a replication of a snapshot from a source storage device within a source domain to a target storage device within a target domain. Exemplary system 100 may also include an identification module 106 programmed to identify a source master system within the source domain and a target master system within the target domain.

In addition, and as will be described in greater detail below, exemplary system 100 may include a metadata module 108 programmed to identify metadata for managing the snapshot at the source master system. Exemplary system 100 may also include a transmission module 110 programmed to transmit the metadata from the source master system to the target master system using a master-to-master communication channel that is separate from a communication channel used for the replication. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., source master system 202, target master system 206, source storage device 220, and/or target storage device 230), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a source master system 202 in communication with a target master system 206 via a network 204 and a source storage device 220 in communication with a target storage device 230 via network 204.

In one embodiment, one or more of modules 102 from FIG. 1 may, when executed by at least one processor of source master system 202, facilitate source master system 202 in replicating snapshots across backup domains. For example, and as will be described in greater detail below, one or more of modules 102 may cause source master system 202 to 1) identify a replication 210 of a snapshot 212 from source storage device 220 within a source domain 250 to target storage device 230 within a target domain 240, 2) identify source master system 202 within source domain 250 and target master system 206 within target domain 240, 3) identify metadata 260 for managing snapshot 212 at the source master system, and 4) transmit metadata 260 from source master system 202 to target master system 206 using a master-to-master communication channel 270 that is separate from a communication channel used for replication 210.

Source master system 202 generally represents any type or form of computing device capable of reading computer-executable instructions. Examples of source master system 202 include, without limitation, servers, desktops, laptops, tablets, cellular phones, personal digital assistants (PDAs), multimedia players, embedded systems, combinations of one or more of the same, exemplary computing system 510 in FIG. 5, or any other suitable computing device. For example, source master system may include a master backup server.

Target master system 206 generally represents any type or form of computing device capable of reading computer-executable instructions. Examples of target master system 206 include, without limitation, servers, desktops, laptops, tablets, cellular phones, personal digital assistants (PDAs), multimedia players, embedded systems, combinations of one or more of the same, exemplary computing system 510 in FIG. 5, or any other suitable computing device. For example, target master system 206 may include a master backup server.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between source master system 202 and target master system 206.

Source storage device 220 may represent portions of a single storage device or a plurality of storage devices and/or computing devices. In some examples, source storage device 220 may represent a portion of computing system 510 in FIG. 5 and/or portions of exemplary network architecture 600 in FIG. 6. Additionally or alternatively, source storage device 220 may represent one or more physically separate devices capable of being accessed by a computing device, such as source master system 202 in FIG. 2, computing system 510 in FIG. 5, and/or portions of exemplary network architecture 600 in FIG. 6.

Target storage device 230 may represent portions of a single storage device or a plurality of storage devices and/or computing devices. In some examples, target storage device 230 may represent a portion of computing system 510 in FIG. 5 and/or portions of exemplary network architecture 600 in FIG. 6. Additionally or alternatively, target storage device 230 may represent one or more physically separate devices capable of being accessed by a computing device, such as target master system 206 in FIG. 2, computing system 510 in FIG. 5, and/or portions of exemplary network architecture 600 in FIG. 6.

Figure 3:
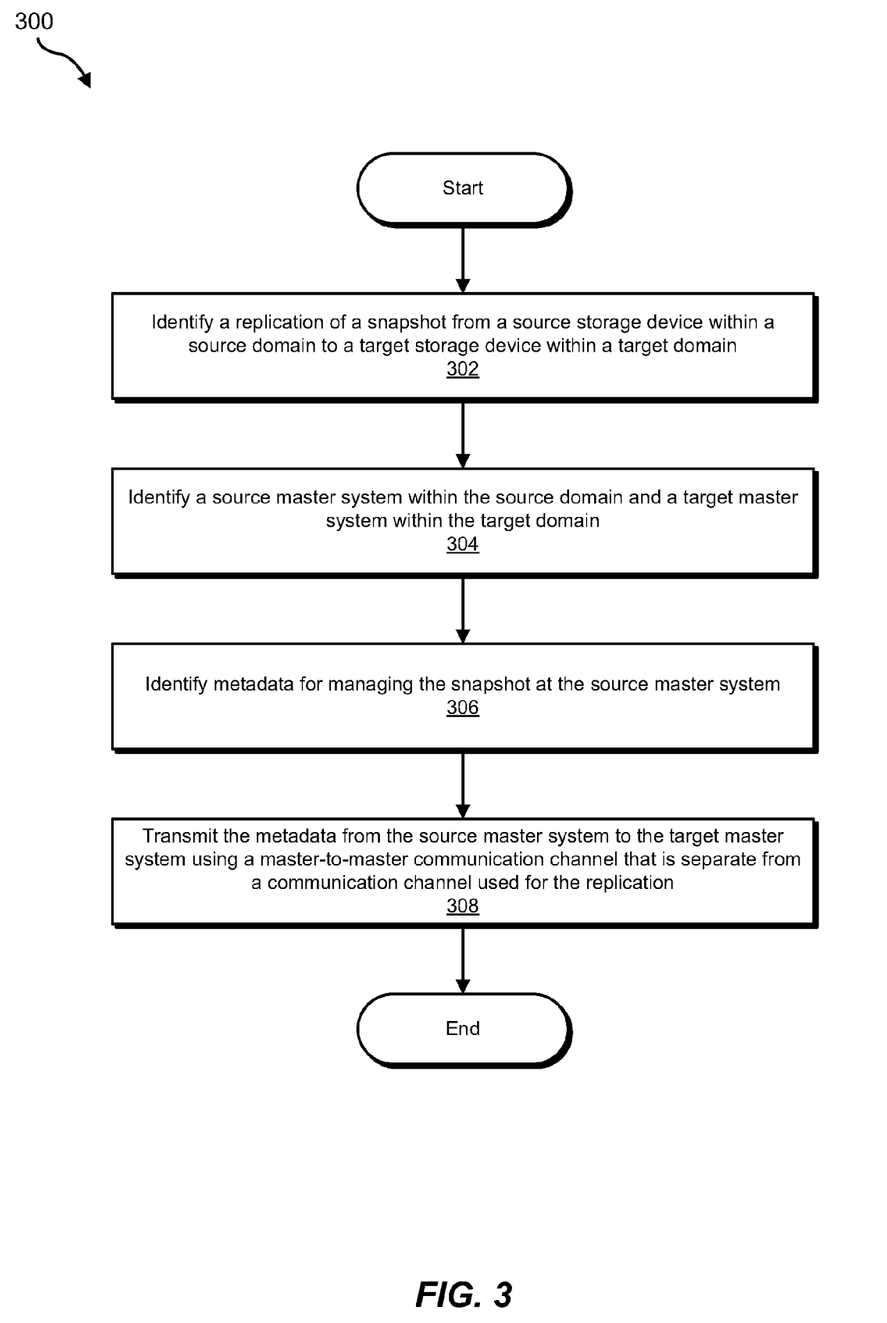
FIG. 3 is a flow diagram of an exemplary method for replicating snapshots across backup domains.

FIG. 3 is a flow diagram of an exemplary computer-implemented method 300 for replicating snapshots across backup domains. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a replication of a snapshot from a source storage device within a source domain to a target storage device within a target domain. For example, at step 302 replication module 104 may, as part of source master system 202 in FIG. 2, identify replication 210 of snapshot 212 from source storage device 220 within source domain 250 to target storage device 230 within target domain 240.

As used herein, the term "snapshot" may refer to any representation of a selection of data (e.g., a volume, a storage location, etc.) in a certain state and/or point in time. In some examples, a "snapshot" may refer to a space-saving snapshot (e.g., a snapshot that references a primary volume for unchanged data) and/or a copy-on-write snapshot (e.g., a snapshot that copies protected data as it existed at the time of the snapshot before overwriting the protected data in order to preserve a point-in-time copy of the data). In some examples, the snapshot may include a block-level snapshot (e.g., copying and/or preserving changed blocks).

In some examples, the snapshot may include a snapshot of a live volume of data. As used herein, the phrase "live volume of data" may refer to any volume of data currently in use (e.g., available for transactions and/or updates, available for use by one or more applications, etc.), any primary volume, and/or any production volume. The snapshot may have been created and/or designated in any of a variety of ways. For example, the snapshot may have been created via a backup job in the source domain (e.g., to protect data on the source storage device). In some examples, a replication system performing the replication may lack one or more permissions for modifying the live volume of data.

As used herein, the term "replication" may refer to any scheme for creating and/or maintaining a copy of a collection of data. Replication module 104 may identify the replication of data. In some examples, replication module 104 may identify the replication when the replication begins (e.g., by receiving, observing, and/or intercepting a message and/or instruction for initiating the replication). Additionally or alternatively, replication module 104 may identify the replication while the replication is in progress. In some examples, replication module 104 may identify the replication when the replication has completed (e.g., by receiving and/or intercepting a message from a replication device and/or system indicating that the replication has completed). In at least one example, replication module 104 may identify the replication by identifying a policy, configuration, and/or schedule for performing the replication (e.g., before the replication has begun).

In some examples, the replication may be performed at the storage level. For example, the source storage device may be configured to replicate the snapshot. Additionally or alternatively, a storage appliance and/or a storage server in communication with the source storage device may be configured to replicate the snapshot. In these examples, a backup server that created the snapshot and/or configured the replication may not fall within the data transmission path of the replication. As will be explained in greater detail below, the replica of the snapshot created by the replication may be owned by a master server within the target domain, but the retention of the replica may depend on one or more policies and/or statuses within the source domain.

As used herein, the term "domain" may refer to a collection of data and computing devices managed by, protected by, and/or under the purview of a master system (e.g., a master backup server). In some examples, the source domain may include one or more applications (e.g., primary and/or production applications) and the target domain may include a disaster recovery site for the applications.

Figure 4:
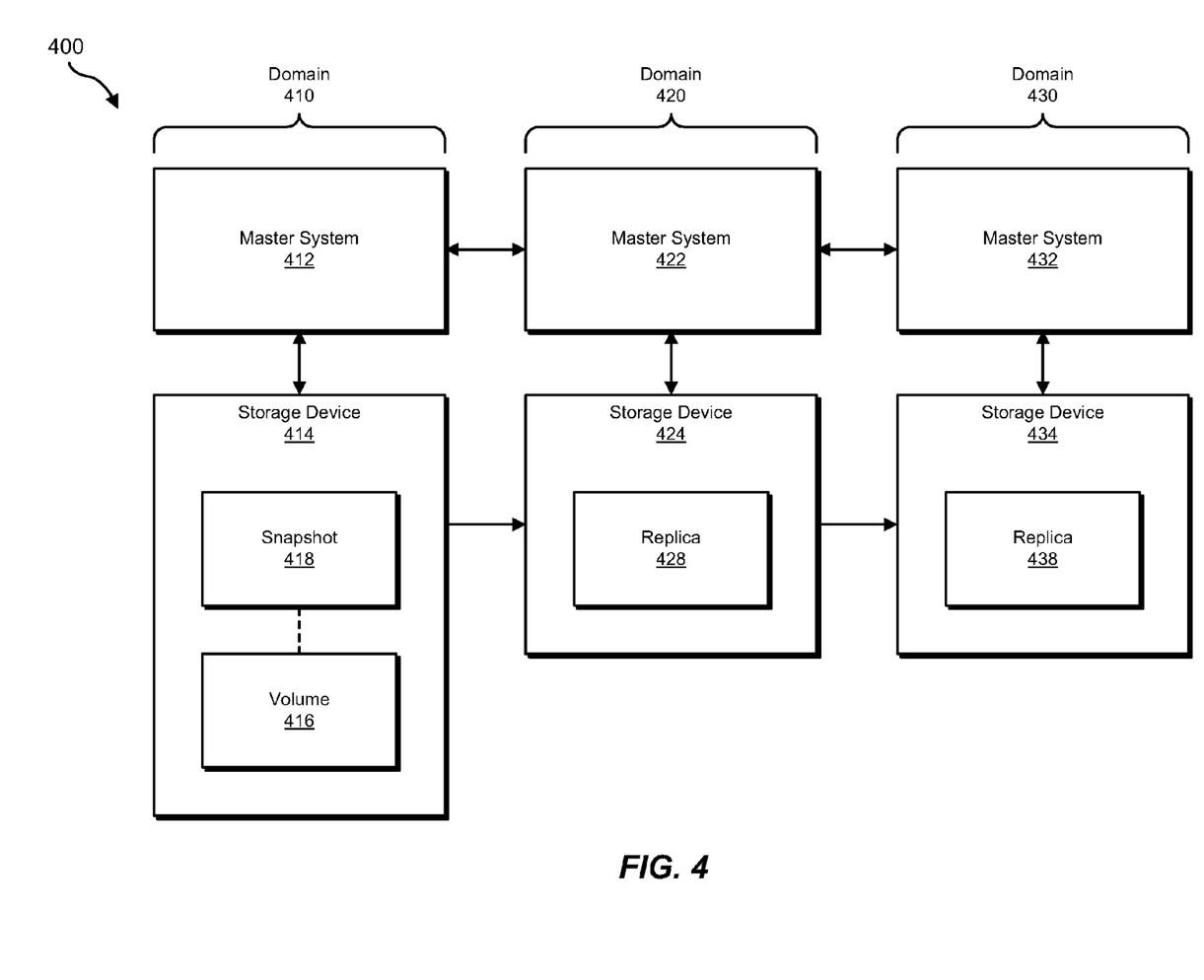
FIG. 4 is a block diagram of an exemplary system for replicating snapshots across backup domains.

FIG. 4 illustrates an exemplary system 400 for replication snapshots across backup domains. As shown in FIG. 4, exemplary system 400 may include a domain 410 with a master system 412 and a storage device 414 (e.g., storing a volume 416 with a snapshot 418), a domain 420 with a master system 422 and a storage device 424 (e.g., storing a replica 428 of snapshot 418), and a domain 430 with a master system 432 and a storage device 434 (e.g., storing a replica 438 of replica 428). Using FIG. 4 as an example, at step 302 replication module 104 may identify a replication of snapshot 418 from storage device 414 to storage device 424 (e.g., creating replica 428).

Returning to FIG. 3, at step 304 one or more of the systems described herein may identify a source master system within the source domain and a target master system within the target domain. For example, at step 304 identification module 106 may, as part of source master system 202 in FIG. 2, identify source master system 202 within source domain 250 and target master system 206 within target domain 240.

As used herein, the phrase "master system" may refer to any computing system for managing, scheduling, configuring, and/or tracking backups and/or replications within, to, and/or from a domain.

Identification module 106 may identify the source master system in any suitable manner. For example, identification module 106 may identify the source master system by executing on the source master system. Additionally or alternatively, identification module 106 may identify the source master system by identifying a name and/or address of the source master system. Likewise, identification module 106 may identify the target master system in any suitable manner. For example, identification module 106 may identify the target master system by identifying a replication target of the replication as defined by a storage lifecycle policy maintained by the source master system.

Using FIG. 4 as an example, identification module 106 may identify master system 412 in domain 410 and master system 422 in domain 420.

Returning to FIG. 3, at step 306 one or more of the systems described herein may identify metadata for managing the snapshot at the source master system. For example, at step 306 metadata module 108 may, as part of source master system 202 in FIG. 2, identify metadata 260 for managing snapshot 212 at the source master system.

As used herein, the term "metadata" may refer to any data describing, referring to, and/or pertaining to a replicated snapshot. The metadata may include any of a variety of metadata. For example, the metadata may include file-system-level metadata describing the snapshot (e.g., file metadata of files within the snapshot). Additionally or alternatively, the metadata may include application-level metadata describing the snapshot (e.g., metadata describing how one or more files within the snapshot relate to one or more applications). In some examples, the metadata may include virtualization-level metadata describing the snapshot (e.g., metadata describing how the replicated snapshot relates to a virtualization system).

Metadata module 108 may identify the metadata in any suitable manner. In some examples, metadata module 108 may analyze the snapshot, the source storage device, a configuration of the source domain, and/or a storage lifecycle policy of the snapshot to derive the metadata.

Using FIG. 4 as an example, metadata module 108 may identify metadata describing snapshot 418.

Returning to FIG. 3, at step 308 one or more of the systems described herein may transmit the metadata from the source master system to the target master system using a master-to-master communication channel that is separate from a communication channel used for the replication. For example, at step 308 transmission module 110 may, as part of source master system 202 in FIG. 2, transmit metadata 260 from source master system 202 to target master system 206 using a master-to-master communication channel 270 that is separate from a communication channel used for replication 210.

As used herein, the phrase "master-to-master communication channel" may refer to any path of communication between a master system of one domain and a master system of another domain. As mentioned earlier, the master-to-master communication channel may be separate from a communication channel used for the replication. For example, the master-to-master communication channel may exclude communicating via replicated data (e.g., by writing the metadata to a volume to be replicated). In some examples, the master-to-master communication channel and the communication channel used for the replication may use one or more networking elements in common (e.g., the same local network infrastructures, the Internet, etc.). Additionally or alternatively, the master-to-master communication channel and the communication channel used for the replication may use separate networks.

In some examples, transmission module 110 may establish the master-to-master communication channel. For example, transmission module 110 may establish the master-to-master communication channel by authenticating the target domain with the source master system and authenticating the source domain with the target master system. For example, transmission module 110 may update a root broker for the source master system to trust the target domain and update a root broker for the target master system to trust the source domain. Additionally or alternatively, transmission module 110 may update a configuration for the source master system to identify the target master system and update a configuration for the target mastery system to identify the source master system.

In some examples, transmission module 110 may transmit the metadata via spool directories. As used herein, the phrase "spool directory" may refer to any temporary storage location for a stream of data. For example, transmission module 110 may write the metadata to a source spool directory within the source domain. Transmission module 110 may then transmit the metadata to a target spool directory within the target domain. In one example, transmission module 110 may notify the target master system when the replication has completed and after writing the metadata to the source spool directory. The target master system may then retrieve the metadata from the source domain and notify the source master system upon successfully retrieving the metadata. By transmitting the metadata via spool directories, the systems and methods described herein may provide tolerance for temporary failures (e.g., network outages, insufficient disk space conditions, etc.) and identify metadata transmission failures (e.g., identifying the metadata as exported to the source spool directory but not transferred to the target domain).

Transmission module 110 may also coordinate storage lifecycle policy information for the snapshot between the source master system and the target master system via the master-to-master communication channel. As used herein, the phrase "storage lifecycle policy" may refer to any policy, configuration, setting, and/or rule applicable to backup data for determining one or more conditions under which the backup data is stored. For example, a storage lifecycle policy may determine the storage location of backup data, the retention and/or expiry of backup data, the replication of backup data, the compression of backup data, the encryption of backup data, etc. Transmission module 110 may coordinate the storage lifecycle policy information by coordinating any of a variety of types of information. For example, transmission module 110 may coordinate the storage lifecycle policy information by identifying, at the target master system, at least one valid storage device for storing data from the snapshot based on a rule established at the source master system. For example, the rule may specify that the storage device meet a predefined metric for reliability, performance, native encryption functions, native replication functions, etc. Additionally or alternatively, the source master system may specify a list of one or more storage systems.

In some examples, transmission module 110 may coordinate the storage lifecycle policy information by determining, at the target master system, that a mirror replica of the snapshot is eligible for expiration based on a configuration established at the source master system. For example, transmission module 110 may transmit information from the source master system to the target master system specifying that the replica of the snapshot expires when the snapshot is removed. Additionally, transmission module 110 may transmit information from the source master system to the target master system specifying when the snapshot has been removed. In one example, transmission module 110 may transmit information between the source master system, the target master system, and/or one or more additional master systems of one or more additional domains to validate a topology specified by the storage lifecycle policy across the master systems.

In some examples, transmission module 110 may determine that the mirror replica of the snapshot is eligible for expiration by identifying an additional mirror replica of the mirror replica and determining that the additional mirror replica is eligible for expiration based on the configuration established at the source master system. For example, transmission module 110 may transmit information from the source master system specifying that the additional mirror replica may not expire before it is completed and that the mirror replica within the target domain may not expire until the additional mirror replica is eligible for expiration.

Using FIG. 4 as an example, transmission module 110 may transmit information between master systems 412, 422, and 432 regarding the expiration policies and/or current statuses of snapshot 418, replica 428, and replica 438 so that master systems 412, 422, and 432 may coordinate the expiry of replicas 428 and replica 438 (e.g., to ensure that all conditions for expiry are fulfilled for replica 428 before removing replica 428 and that all conditions for expiry are fulfilled for replica 438 before removing replica 438, including conditions across domains 410, 420, and 430).

In some examples, transmission module 110 may also coordinating failure-checking information for the replication of the snapshot between the source master system and the target master system via the master-to-master communication channel. For example, transmission module 110 may transmit information about data transmission rates and/or bandwidth consumption between master systems (e.g., to identify bottlenecks created by too much data being sent). As another example, the target master system may communication with the source master system via the master-to-master communication channel established by transmission module 110 when data managed by the target master system is deleted earlier than planned for (e.g., according to a storage lifecycle policy). In some examples, the target master system may use the master-to-master communication channel to determine what master systems (e.g., including the source master system) are sending data to the target domain. In some examples, the source master system may use the master-to-master communication channel to determine what happens to data replicated to the target domain (e.g., whether the data is available, whether the data has been replicated from the target domain to yet another domain, whether the data has expired, etc.).

As explained above, by establishing master-to-master communication channels between backup domains, the systems and methods described herein may facilitate the interpretation, organization, use, and/or management of replicas across backup domains. For example, these systems and methods may establish master-to-master communication channels between masters systems of backup domains for transmitting metadata describing replicas, information for managing replicas (e.g., expiry policy and/or expiry status information), and/or information describing the health of systems performing replications.

Figure 5:
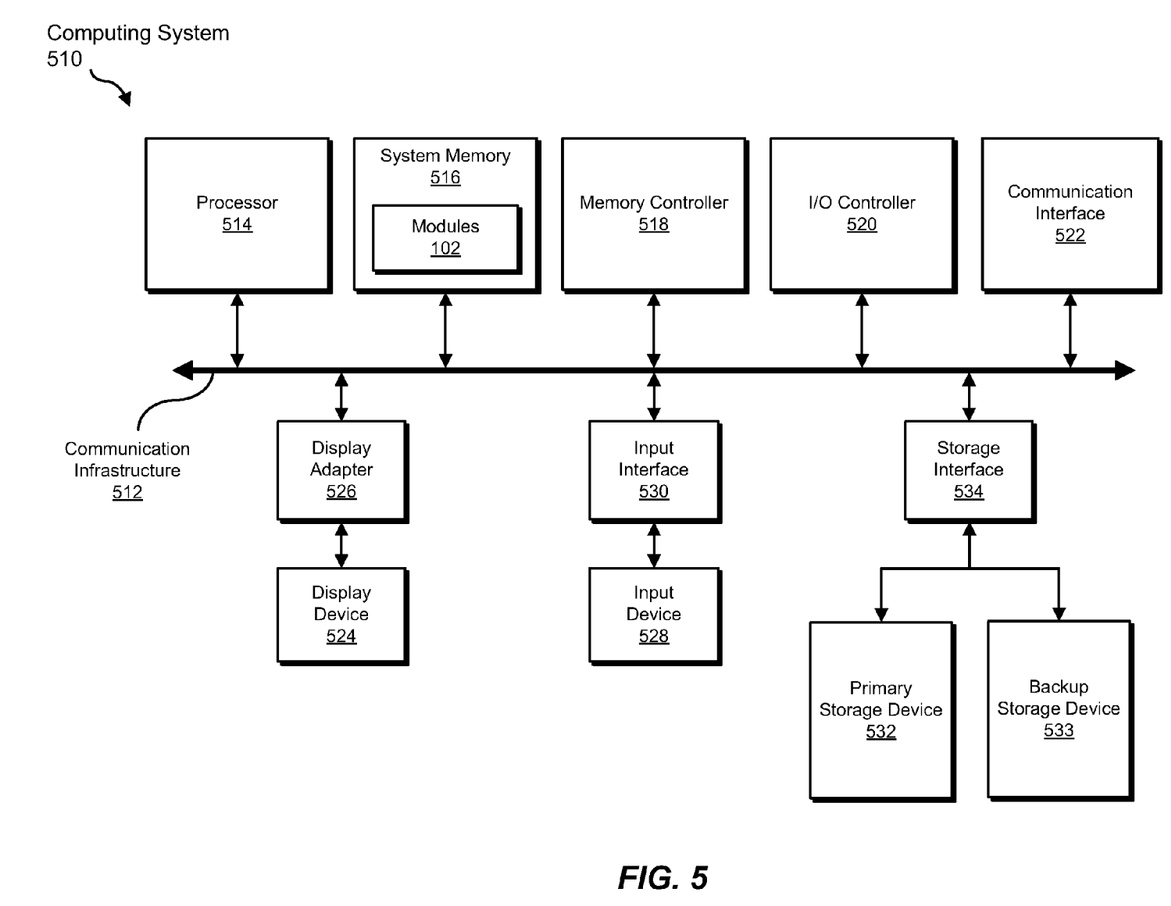
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, transmitting, authentication, writing, coordinating, and determining steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
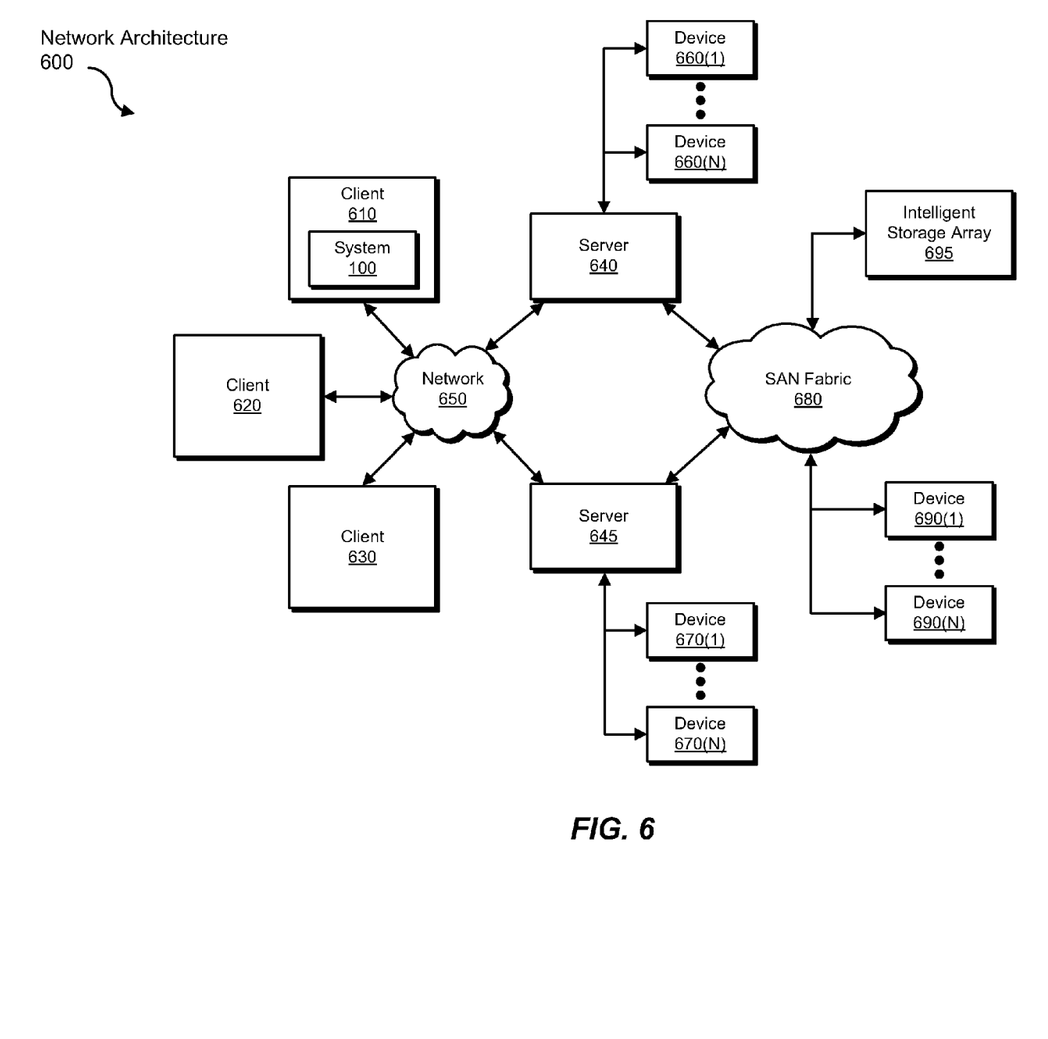
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, transmitting, authentication, writing, coordinating, and determining steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for replicating snapshots across backup domains.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for replicating snapshots across backup domains (by, e.g., replicating metadata for the snapshots via master-to-master communication channels).

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for replicating snapshots across backup domains, at least a portion of the method being performed by a computing device comprising at least one processor, the method comprising:
identifying a replication of a snapshot from a source storage device within a source domain to a target storage device within a target domain;

identifying a source master system within the source domain and a target master system within the target domain;

identifying metadata for managing the snapshot at the source master system;

transmitting the metadata from the source master system to the target master system using a master-to-master communication channel that is separate from a communication channel used for the replication and that excludes both writing the metadata to the source storage device and reading the metadata from the source storage device.

2. The computer-implemented method of claim 1, further comprising establishing the master-to-master communication channel by:

authenticating the target domain with the source master system;

authenticating the source domain with the target master system.

3. The computer-implemented method of claim 1, wherein the metadata comprises at least one of:

file-system-level metadata describing the snapshot;
application-level metadata describing the snapshot;
virtualization-level metadata describing the snapshot.

4. The computer-implemented method of claim 1, wherein transmitting the metadata comprises:

writing the metadata to a source spool directory within the source domain;

transmitting the metadata to a target spool directory within the target domain.

5. The computer-implemented method of claim 1, further comprising coordinating storage lifecycle policy information for the snapshot between the source master system and the target master system via the master-to-master communication channel.

6. The computer-implemented method of claim 5, wherein coordinating the storage lifecycle policy information for the snapshot comprises identifying, at the target master system, at least one valid storage device for storing data from the snapshot based on a rule established at the source master system.

7. The computer-implemented method of claim 5, wherein coordinating the storage lifecycle policy information for the snapshot comprises determining, at the target master system, that a mirror replica of the snapshot is eligible for expiration based on a configuration established at the source master system.

8. The computer-implemented method of claim 7, wherein determining that the mirror replica of the snapshot is eligible for expiration comprises:

identifying an additional mirror replica of the mirror replica;

determining that the additional mirror replica is eligible for expiration based on the configuration established at the source master system.

9. The computer-implemented method of claim 1, further comprising coordinating failure-checking information for the replication of the snapshot between the source master system and the target master system via the master-to-master communication channel.

10. A system for replicating snapshots across backup domains, the system comprising:

a replication module programmed to identify a replication of a snapshot from a source storage device within a source domain to a target storage device within a target domain;

an identification module programmed to identify a source master system within the source domain and a target master system within the target domain;

a metadata module programmed to identify metadata for managing the snapshot at the source master system;

a transmission module programmed to transmit the metadata from the source master system to the target master system using a master-to-master communication channel that is separate from a communication channel used for the replication and that excludes both writing the metadata to the source storage device and reading the metadata from the source storage device;

at least one processor configured to execute the replication module, the identification module, the metadata module, and the transmission module.

11. The system of claim 10, further comprising establishing the master-to-master communication channel by:

authenticating the target domain with the source master system;

authenticating the source domain with the target master system.

12. The system of claim 10, wherein the metadata comprises at least one of:

file-system-level metadata describing the snapshot;
application-level metadata describing the snapshot;
virtualization-level metadata describing the snapshot.

13. The system of claim 10, wherein transmitting the metadata comprises:

writing the metadata to a source spool directory within the source domain;

transmitting the metadata to a target spool directory within the target domain.

14. The system of claim 10, further comprising coordinating storage lifecycle policy information for the snapshot between the source master system and the target master system via the master-to-master communication channel.

15. The system of claim 14, wherein coordinating the storage lifecycle policy information for the snapshot comprises identifying, at the target master system, at least one valid storage device for storing data from the snapshot based on a rule established at the source master system.

16. The system of claim 14, wherein coordinating the storage lifecycle policy information for the snapshot comprises determining, at the target master system, that a mirror replica of the snapshot is eligible for expiration based on a configuration established at the source master system.

17. The system of claim 16, wherein determining that the mirror replica of the snapshot is eligible for expiration comprises:

identifying an additional mirror replica of the mirror replica;

determining that the additional mirror replica is eligible for expiration based on the configuration established at the source master system.

18. The system of claim 10, further comprising coordinating failure-checking information for the replication of the snapshot between the source master system and the target master system via the master-to-master communication channel.

19. A computer-readable-storage medium comprising one or more computer-executable instructions that, when executed by at least one processor of a computing device, cause the computing device to:

identify a replication of a snapshot from a source storage device within a source domain to a target storage device within a target domain;

identify a source master system within the source domain and a target master system within the target domain;

identify metadata for managing the snapshot at the source master system;

transmit the metadata from the source master system to the target master system using a master-to-master communication channel that is separate from a communication channel used for the replication and that excludes both writing the metadata to the source storage device and reading the metadata from the source storage device.

20. The computer-readable-storage medium of claim 19, wherein the one or more computer-executable instructions further cause the computing device to:

authenticate the target domain with the source master system;

authenticate the source domain with the target master system.

\* \* \* \* \*